United States Patent
Zheng et al.

(10) Patent No.: US 10,887,756 B2
(45) Date of Patent: Jan. 5, 2021

(54) GROUP ESTABLISHMENT METHOD AND SYSTEM FOR MULTI-LOGIN AUTHENTICATION USER AND SWITCHING DEVICE, ELECTRONIC DEVICE AND STORAGE MEDIUM THEREOF

(71) Applicants: Inventec Appliances (Pudong) Corporation, Shanghai (CN); Inventec Appliances (Shanghai) Co., Ltd., Shanghai (CN)

(72) Inventors: Yong-Ping Zheng, Shanghai (CN); Shih-Kuang Tsai, Shanghai (CN)

(73) Assignees: Inventec Appliances (Pudong) Corporation, Shanghai (CN); Inventec Appliances (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 16/431,711

(22) Filed: Jun. 4, 2019

(65) Prior Publication Data

US 2020/0100097 A1 Mar. 26, 2020

(30) Foreign Application Priority Data

Sep. 21, 2018 (CN) .......................... 2018 1 1106348

(51) Int. Cl.
| | |
|---|---|
| *H04W 8/18* | (2009.01) |
| *H04W 4/80* | (2018.01) |
| *H04L 29/06* | (2006.01) |
| *H04W 4/08* | (2009.01) |
| *H04W 12/06* | (2009.01) |
| *H04W 88/14* | (2009.01) |

(52) U.S. Cl.
CPC .......... *H04W 8/186* (2013.01); *H04L 63/0853* (2013.01); *H04W 4/08* (2013.01); *H04W 4/80* (2018.02); *H04W 8/183* (2013.01); *H04W 12/06* (2013.01); *H04W 88/14* (2013.01)

(58) Field of Classification Search
CPC ....... H04W 8/186; H04W 4/80; H04W 88/14; H04W 8/183; H04W 12/06; H04W 4/08; H04L 63/0853
See application file for complete search history.

(56) References Cited

U.S. PATENT DOCUMENTS

| | | | | |
|---|---|---|---|---|
| 2011/0258275 | A1* | 10/2011 | Rao ........................ | G06Q 10/10 709/206 |
| 2012/0259930 | A1* | 10/2012 | Wu ...................... | G06F 16/9535 709/206 |
| 2017/0006095 | A1* | 1/2017 | Jiang ....................... | H04L 69/28 |
| 2019/0215062 | A1* | 7/2019 | Engelen ................. | H04W 4/70 |
| 2019/0261443 | A1* | 8/2019 | Baligh .................. | H04W 40/16 |
| 2019/0289458 | A1* | 9/2019 | Saija ..................... | H04W 8/186 |

* cited by examiner

*Primary Examiner* — Marisol Figueroa
(74) *Attorney, Agent, or Firm* — CKC & Partners Co., LLC (57) ABSTRACT

A method of group establishment for multi-login authentication user implemented by a switching device, the method comprises steps of receiving, by the switching device, group configuration information, carried by a first network signal, of at least one communication device including an eSIM card, wherein the group configuration information includes eSIM card information; and establishing, by the switching device, a communication group list which allows the communication devices on the list to interacts each other via the switching device for data sharing.

12 Claims, 10 Drawing Sheets

GROUP ESTABLISHMENT METHOD AND SYSTEM FOR MULTI-LOGIN AUTHENTICATION USER AND SWITCHING DEVICE, ELECTRONIC DEVICE AND STORAGE MEDIUM THEREOF

CROSS REFERENCE

This application is based upon and claims the benefit of priority of Chinese Patent Applications No. 201811106348.3, filed on Sep. 21, 2018, the entire contents thereof are incorporated herein by reference.

TECHNICAL FIELD

The present disclosure relates to the communication field, specifically to a group establishment method and system for multi-login authentication user and a switching device, electronic devices and storage medium thereof.

BACKGROUND

SIM card (Subscriber Identification Module) is an integrated chip including microprocessor, ROM, RAM, EEPROM and serial communication unit. However, the SIM card may have some defects when it is used. For example, different card slot sizes need to be adjusted to fit the size of the SIM card and the insufficient SIM card memory capacity, the physical card occupy space, and limitations of selecting the operator.

In order to solve the mentioned problems of the SIM card, a virtual SIM card, named as an eSIM card (embedded SIM card) is then provided. The concept of the eSIM card is to embed the traditional SIM card information directly on the device chip, instead of being added as an additional and removable component of the device. The user does not need to insert the physical SIM card. Therefore, the mentioned problems regarding the SIM card are solved due to the existence of the eSIM card. Therefore, the goal of a number with a plurality of communication devices and a communication device with a number are then achieved by embedded the eSIM card information into the communication device.

In addition, in one aspect of the existing technology, in some conferences or gatherings, users participating in a meeting or gathering usually use face-to-face interactions. For example, introducing each other, exchanging paper business cards. In order to communicate online, users need to exchange face-to-face contacts, and manually enter the mobile phone number or other social network accounts, which allows the users to communicate online. Such processes are too cumbersome for the participants, and the goal of online interactions of all users in the meeting or gathering is not achieved. Therefore, the user experience needs to be improved.

Moreover, with the development of mobile communication technologies, the advanced cellular networks (e.g. Long Term Evolution (LTE), 4G mobile communication network) have being widely deployed, since Orthogonal Frequency Division Multiplexing (OFDM) and Multi-Input & Multi-Output (MIMO), 4G are widely applied for significantly improving spectral efficiency and data transfer rate.

Although the data rates have been significantly improved by the advanced cellular networks, the network connection typically varies depending on where the handset is located during a video call made over the network connection between the handset and the base station. For example, when a user makes a call in a place with a bad network signal reception, the quality of the call is then affected. Meanwhile, during the call, the mobile phone and the base station need to maintain long-distance network connection and data transmission. Therefore, the radiation of the mobile phone will reach 100-300 $\mu W/cm^2$. If the user has long time talk over the mobile phone, the users receives large amounts of radiation.

SUMMARY

In the light of the problems of the prior art, an objective of the present disclosure is to provide a group establishment method and system for multi-login authentication user and a switching device, electronic devices and storage medium thereof. Therefore, the group establishment, in response to the eSIM, is then achieved which allows the devices in the group to interact each other and allows the devices in the group to interact with external devices.

In one embodiment of the present disclosure, a method of group establishment for multi-login authentication user implemented by a switching device, the method comprises steps of receiving, by the switching device, group configuration information, carried by a first network signal, of at least one communication device including an eSIM card, wherein the group configuration information includes eSIM card information; and establishing, by the switching device, a communication group list which allows the communication devices on the list to interacts each other via the switching device for data sharing.

In one embodiment of the present disclosure, a switching device comprises a first communication module configured to transmitted information via a first network signal, an eSIM module configured to receive group configuration information, carried by the first network signal, of at least one communication device including an eSIM card, wherein the group configuration information includes eSIM card information, and a group list establishing module configured to establish a communication grouping list in response to the received eSIM card information which allows the communication devices on the list to interacts each other via the switching device for data sharing.

The method and the devices of the present disclosure establish a communication group list in response to eSIM card information carried by a first network signal which allows the devices, having the eSIM card information carried by a first network signal, to interact each other for data sharing. Therefore, for on-line data sharing and interactions between the communication devices, it is not required for users to input mobile phone number face-to-face or other social network accounts. Moreover, a communication device, on the communication group list, having eSIM card is able to communicate with another communication device, having eSIM card, on the communication group list or another communication device, having eSIM card, outside the communication group list by interactively switching the first network signal and a second network signal via a switching device. In the present disclosure, the communication signal mode is switchable by the switching device in order to maintain the communication quality between the communication devices having eSIM card if the network signal is not stable. The signal radiations generated during interactions between the communication devices having eSIM card are then minimized by switching, by the switching device, the communication mode of the communication devices having eSIM card.

In order to further understand the features and technical contents of the present disclosure please refer to the following detailed description and drawings related to the present disclosure. However, the detailed description and the drawings are merely illustrative of the disclosure and are not intended to limit the scope of the claims.

BRIEF DESCRIPTION OF THE DRAWINGS

Embodiments of the present disclosure will now be described, by way of example only, with reference to the accompanying schematic drawings in which corresponding reference symbols indicate corresponding parts, and in which.

DETAILED DESCRIPTION

In the following, embodiments of the present disclosure will be described in detail referring to figures. The concept and its realizations of the present disclosure can be implemented in a plurality of forms, and should not be understood to be limited to the embodiments described hereafter. In contrary, these embodiments are provided to make the present disclosure more comprehensive and understandable, and so the conception of the embodiments can be conveyed to the technicians in the art fully. Same reference signs in the figures refer to same or similar structures, so repeated description of them will be omitted.

In the light of the problems of the prior art, an objective of the present disclosure is to provide a group establishment method and system for multi-login authentication user and a switching device, electronic devices and storage medium thereof.

Figure 1:
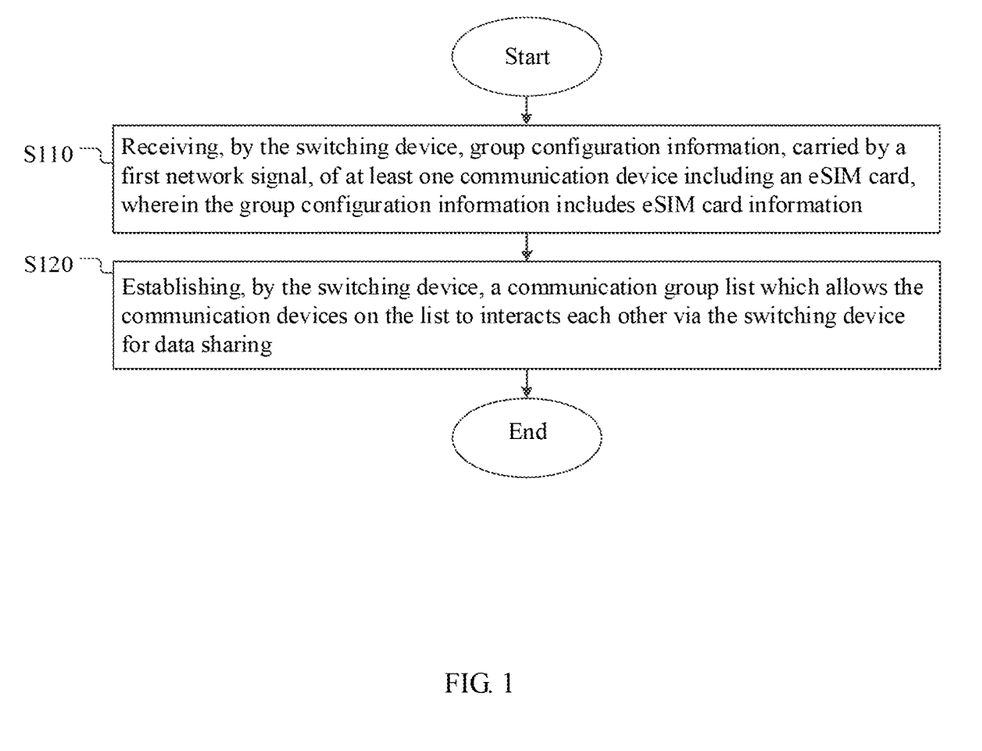
FIG. 1 shows a flow chart of a method of group establishment for multi-login authentication user of one embodiment of the present disclosure.

FIG. 1 shows a flow chart of a method of group establishment for multi-login authentication user of one embodiment of the present disclosure. The method of group establishment for multi-login authentication user is implemented by a switching device. As shown in FIG. 1, in step S110, group configuration information, carried by a first network signal, of at least one communication device including an eSIM card is received by a switching device. The group configuration information includes eSIM card information. In step S102, a communication group list is established by the switching device, wherein the communication group list allows the communication devices on the list to interacts each other via the switching device for data sharing.

The method of the present disclosure establish a communication group list in response to eSIM card information carried by a first network signal, which allows the devices, having the eSIM card information carried by a first network signal, to interact each other for data sharing. Therefore, for on-line data sharing and interactions between the communication devices, it is not necessary for users to input mobile phone number face-to-face or other social network accounts.

Figure 2:
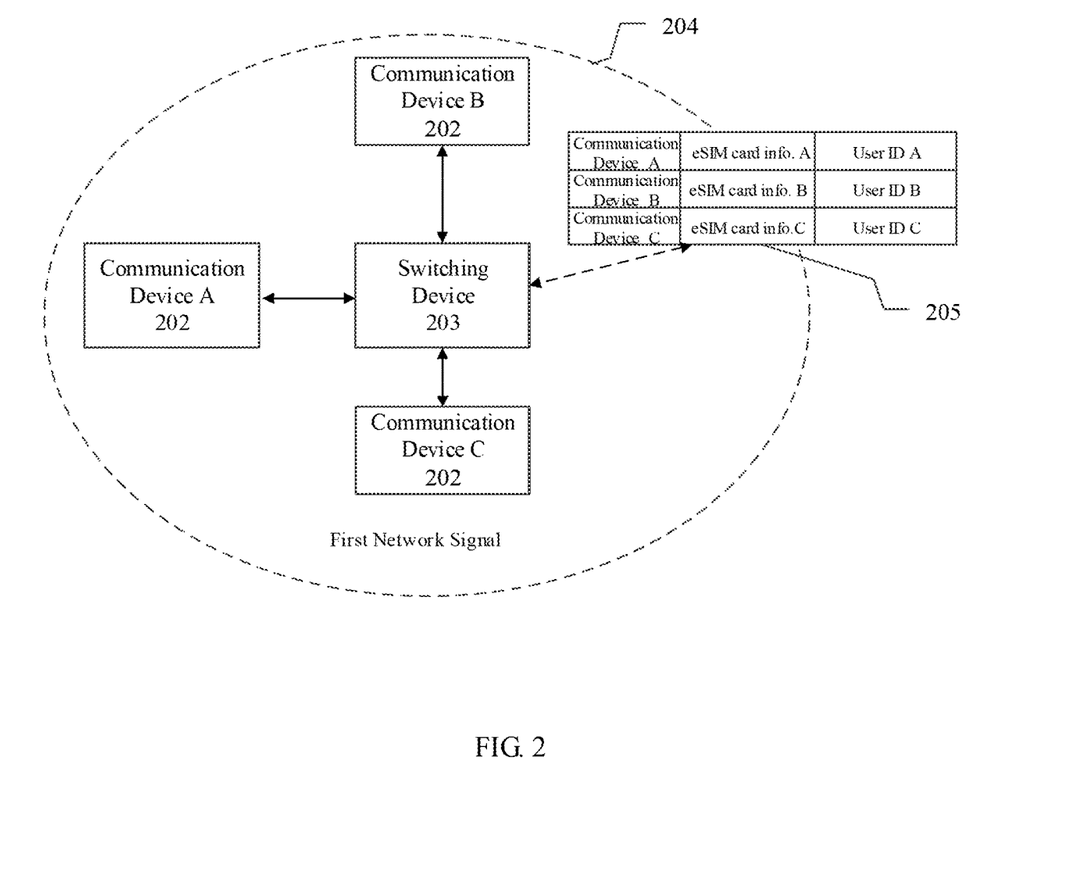
FIG. 2 shows a schematic view of a system of group establishment for multi-login authentication user of one embodiment of the present disclosure.

FIG. 2 shows a schematic view of a system of group establishment for multi-login authentication user of one embodiment of the present disclosure. As shown in FIG. 2, a plurality of communication devices 202 including a communication device A, a communication device B, and a communication device C, wherein the communication devices 202 are located within the coverage of the first network signal of the switching device 203. In this embodiment, the first network signal, e.g. a short range communication signal, includes a signal type of WIFI, Bluetooth, Ultra Wideband (UWB) and Zigbee.

The group configuration information, including eSIM card information, respectively coming from the communication device A, the communication device B, and the communication device C is received by the switching device 203. A communication group list 205 is then established, by the switching device, in response to the received eSIM card information. The communication group list 205, in this embodiment, includes eSIM card information of each of the communication devices and association between each of the communication devices, e.g. association of the eSIM card information and the identification of the communication device, or association of the eSIM card information and the communication link of the communication device and the switching device 203. The present disclosure is not limited thereto, and other identifications, being able to distinguish the communication device 202, are associated with the eSIM card information.

In some embodiments, the group configuration information further includes pre-stored user identification. The user identification information includes user name information and/or job position information. In some embodiment, the eSIM card information and the user name identification of the group configuration information are not sent in the same step, which means the eSIM card information is firstly transmitted by the communication device 202, and the user name identification is then transmitted. In this embodiment, the communication group list 205 further includes an association of the eSIM card information and the user name identification information. In some embodiments, the group configuration information further includes other user information and communication device information.

As shown in FIG. 2, the communication devices 202, on the communication group list 205, interact with each other via the switching device 203. For example, the communication device A on the list communicates with the communication device B on the list via the switching device 203. In some embodiments, all of the communication devices on the list interact with each other via the switching device 203 for data sharing. In some embodiments, a portion of the communication devices on the list interact with each other via the switching device 203 for data sharing.

Moreover, when a communication device newly enters into the coverage 204 of the first network signal of the switching device 203, group configuration information of the newly entered communication device is received by the switching device 203. When a communication device 202 on the communication group list 205 leaves the coverage 204 of the first network signal of the switching device 203, the leaved communication device is removed from the list 205 by the switching device.

Moreover, in order to allow at least one communication device 202 on the communication group list 205 to interact with other communication devices 202 on the communication group list 205, the communication group list 205, in some embodiments, is delivered to the at least one communication device 202 on the communication group list 205. In some embodiments, the delivered communication group list 205 includes full information of the communication devices 202 on the communication group list 205. In some embodiments, the delivered communication group list 205 includes partial information of the communication devices 202 on the communication group list 205, wherein the partial information is selected in response to the user's preferences. For example, if a user of a communication device A of the communication group list 205 only want to share the user name information and partial eSIM card information with rest of communication devices 202 of the communication group list 205, the user name information and partial eSIM card information of the communication group list 205 will be blocked by the switching device 203 before the communication group list 205 is delivered to the other communication devices 202 of the communication group list 205.

In some embodiments, the switching device 203 is further configured to receive a first interaction request transmitted by a communication device 202 of the communication group list 205. The first interaction request is used for indicating another communication device 202 as a pending interaction device. A first data transmitting path of the two communication devices 202 is then established, by the switching device, in response to the first interaction request. For example, a first interaction request, transmitted by a communication device A' of the communication device group list 205, is received by the switching device 203. The first interaction request is used for indicating a communication device B of the communication device group list 205 as a pending interaction device. A first data transmitting path of the communication device A' and the communication B is then established by the switching device 203. Moreover, the communication B is determined, by the switching device 203, as a pending interaction communication device in response to at least one of the hardware label of the communication device B, eSIM card information, the link label of the communication device B and the switching device 203. The first interactive request includes at least one of a document transmitting request, a voice interaction request and a video stream interaction request. Furthermore, the document transmitting request includes a user name identification information interaction request and/or a data interaction request. Therefore, the interaction, caused in response to the eSIM card information of the communication devices of the communication device group list, between the communication devices includes at least one of the on-line user name identification information interaction, e.g. business cards exchange, the text interaction, the voice interaction, the video stream interaction and the document sharing is capable being implemented by the method of group establishment for multi-login authentication user implemented by a switching device of the present disclosure. Therefore, for on-line data sharing and interactions between the communication devices, it is not necessary for users to input mobile phone number face-to-face or other social network accounts.

Figure 3:
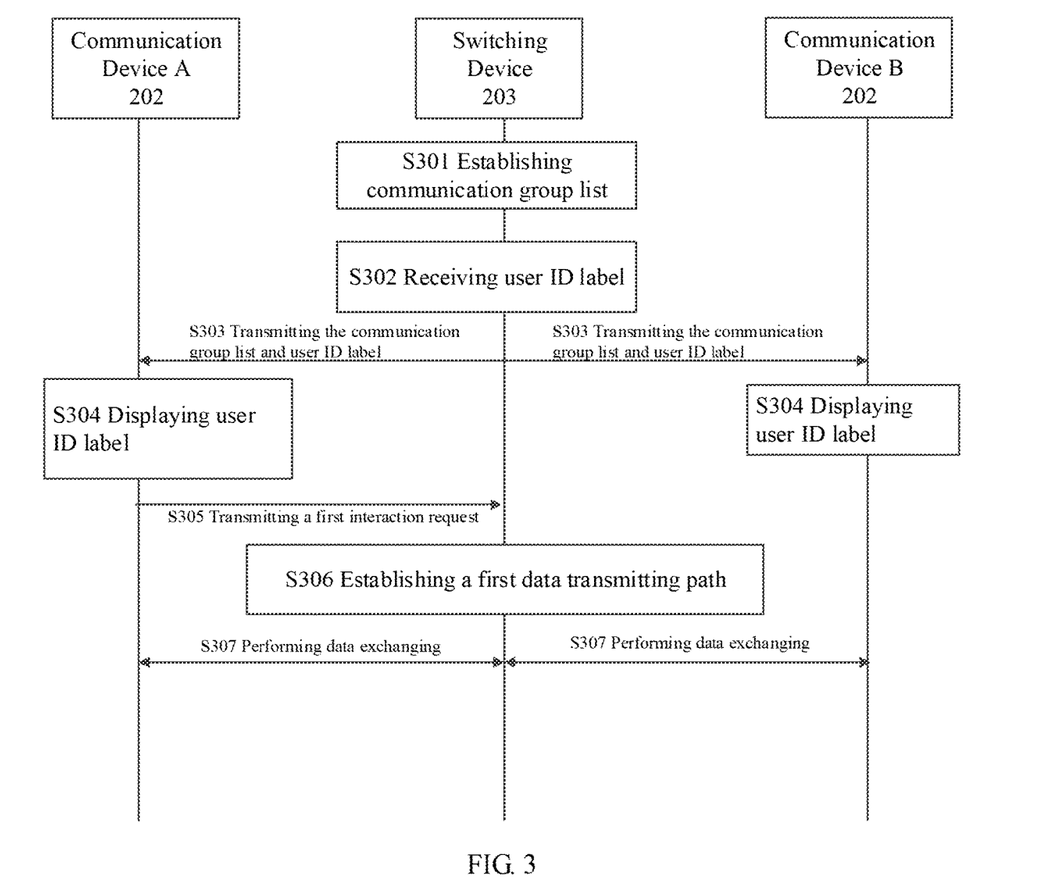
FIG. 3 shows a sequence diagram of a method of group establishment for multi-login authentication user of one embodiment of the present disclosure.

FIG. 3 shows a sequence diagram of a method of group establishment for multi-login authentication user of one embodiment of the present disclosure. As shown in FIG. 3, the communication device A and the communication device B are located in the signal coverage of the first network signal of the switching device 203. In step S301, a communication device group list is created by the switching device 203. In step S302, a user identification label of each communication device of the communication device group list is received by the switching device 203. In step of S303, the communication device group list is respectively delivered to the communication device A and the communication device B. In step of S304, the user identification label of each communication device of the communication device group list is respectively presented at the communication device A and the communication device B. In step of S305, a first interaction request of the communication device A is transmitted, via the switching device, to the communication device B. In step of S306, a first data transmitting path of the communication device A and the communication device B is established by the switching device 203. In step of S307, data exchanging, via the first network signal utilized in the first data transmitting path, between the communication device A and the communication device B is implemented.

Moreover, the creation of the communication group list is caused at the application layer of the switching device. The communication between the communication device A and the communication device B is implemented by an application installed in the communication device. The present invention is not limited thereto.

FIG. 3 is a schematic view of a specific embodiment of the present disclosure, and the present disclosure is not limited thereto, and the steps of merging, splitting, adding, and omitting the steps are not in violation of the inventive concept are within the scope of protection of the present invention.

Figure 4:
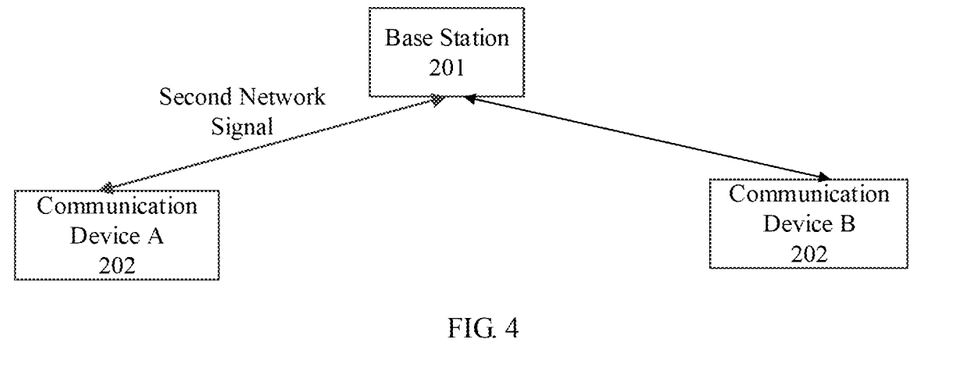
FIG. 4 shows a schematic view of communications, communicating via a base station, of a communication device.

FIG. 4 shows a schematic view of communications, via a base station, of a communication device. As shown in FIG. 4, a communication device A (202) and a communication B (202) respectively communicate with a base station 201 via a carrier signal (a second network signal) in order to perform communications, including Short Message Service (SMS) communication, telecommunication and video stream communication, between the communication device A and the communication B via the base station 201.

However, once the communication device A or the communication device B enters an area, e.g. a parking lot, with bad signal reception, the interactions between the communication device A and the communication device B will be interfered. Therefore, in order to avoid the communication interferences between the communication device A and the communication device B, the method of group establishment for multi-login authentication user of the present disclosure further provides communication interactions between the communication device outside the communication group list and the communication device of the communication group list.

Figure 5:
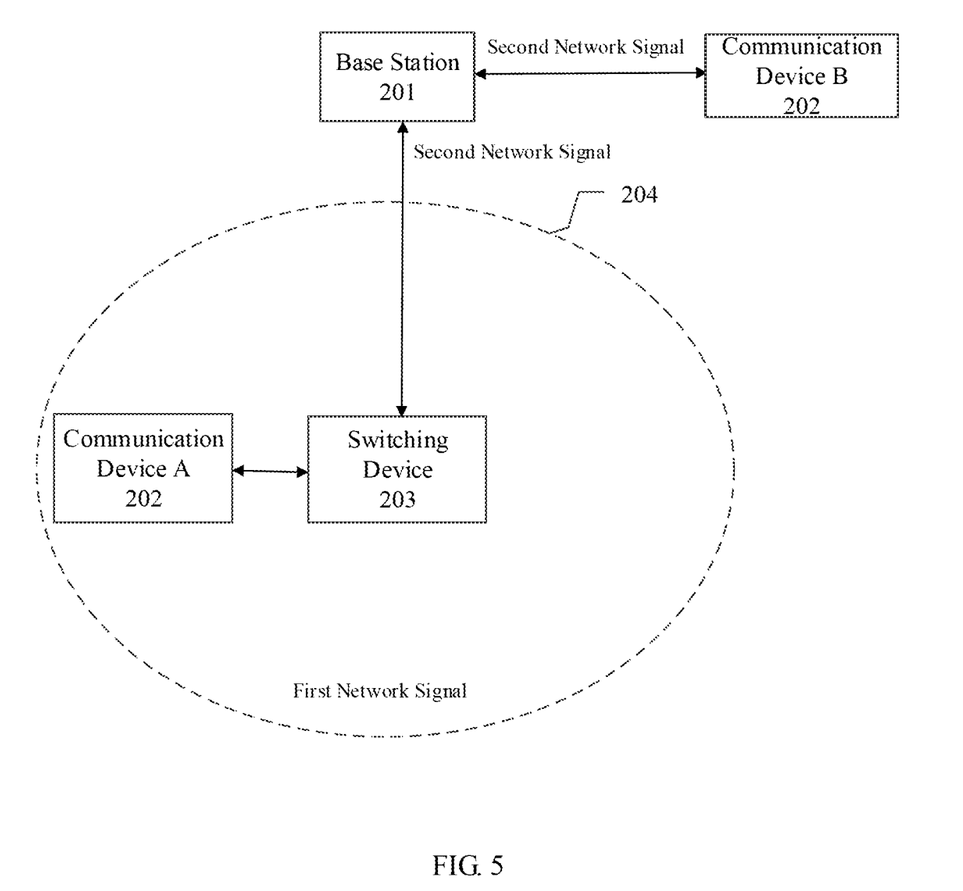
FIG. 5 shows a schematic view of communications, via a switching device, between a communication device on a communication group list and a communication device outside of the communication group list of one embodiment of the present disclosure.

FIG. 5 shows a schematic view of communications, via a switching device, between a communication device on a communication group list and a communication device outside of the communication group list of one embodiment of the present disclosure. As shown in FIG. 5, in this embodiment, the communication B (202) is located outside the signal coverage 204 of the first network signal of the switching device 203 which means the communication device B is not on the communication group list. Moreover, the communication A (202) is located in the signal coverage 204 of the first network signal of the switching device 203 which means the communication device A is on the communication group list.

Therefore, in this embodiment, a second interaction request transmitted from the communication device B, as the first communication device, of the communication group list is received by the switching device 203 via a second network signal. The second interaction request is used for indicating at least one communication device, i.e. the communication device A, of the communication group list as a pending second communication device. A second data transmission path, including the first communication device the switching device and the second communication device, is then established by the switching device 203.

In some embodiments, the switching device 203 of the second data transmission path uses the eSIM card information of the second communication device (i.e. the communication device A) to communicate with the first communication device (i.e. the communication device B) via the second network signal. The switching device 203 interacts with the second communication device (i.e. communication device A) of the communication group list via the first network signal.

In some embodiments, the switching device 203 is a communication device including an eSIM card. Therefore, the switching device 203 communicates with the communication device B, outside the communication group list, via the base station 201. In this embodiment, the base station 201 and the switching device 203 serve as relays for communication between the communication device A and the communication device B. Moreover, the second data transmission path includes the link, utilizing the first network signal, between the communication device A and the switching device 203, the link, utilizing the second network signal, between the base station 201 and the switching device 203 and the link, utilizing the second network signal, between the base station 201 and the communication device B.

In some embodiments, a third interaction request, coming from the third communication device, i.e. the communication device A, of the communication group list is received, via the first network signal, by the switching device 203. The third interaction request is used for indicating at least one communication device, a fourth communication device, outside the communication group list as a pending interaction device. The fourth communication device, in this embodiment is the communication B.

In some embodiments, the switching device 203 of the third data transmission path uses the eSIM card information of the third communication device (i.e. the communication device A) to communicate with the fourth communication device (i.e. the communication device B) via the second network signal. The switching device 203 interacts with the third communication device (i.e. communication device A) of the communication group list via the first network signal.

In this embodiment, the switching device 203 is a communication device including an eSIM card. Therefore, the switching device 203 communicates with the communication device B, outside the communication group list, via the base station 201. In this embodiment, the base station 201 and the switching device 203 serve as relays for communication between the communication device A and the communication device B. Moreover, the third data transmission path includes the link, utilizing the first network signal, between the communication device A and the switching device 203, the link, utilizing the second network signal, between the base station 201 and the switching device 203 and the link, utilizing the second network signal, between the base station 201 and the communication device B.

Thus, in some embodiments, a communication device having eSIM card is capable of communicating, via the switching device, with another communication device having eSIM card inside and outside the communication group list with utilizing the first network signal and the second network signal, which means the communication mode of the communication device having eSIM card is switched by the switching device. Therefore, the data interactions of the communication devices are switched to the first network signal when the reception of the second network signal is not stable.

In one embodiment of the present disclosure, the radiation strength of the first network signal is weaker than the radiation strength of the second network signal. The first network signal includes WIFI, Bluetooth, Ultra Wideband (UWB) and Zigbee. The second network signal includes a carrier network signal. Furthermore, the second network, e.g. a mobile 4G network, has radiation power 100-300 $\mu W/cm^2$. The first network, a short range network, i.g. Bluetooth, has radiation power 1-4 $\mu W/cm^2$. In some embodiments, the first network includes a wireless local area network (WLAN) having radiation power smaller than the second network, ZigBee, ultra wide band (UWB). Therefore, the signal radiation is then reduced when the communication device communicates with other communication devices.

Moreover, the communication devices of the communication group list communicate with the external base station via the second network signal. In some embodiments, when the communication group list, carried by the first network signal, is created by the switching device, the communication of the communication devices of the communication group list and the external base station is then terminated. Thus, the communication mode is switched.

Furthermore, since a communication device has a plurality of eSIM cards belong to various carriers. In some embodiments of the present disclosure, the communication services of the plurality of eSIM cards are switched by the switching device 203. The switching device 203 is configured to receive service plan configuration information of a SIM card and service plan configuration information of the eSIM card of the communication device of the communication group list. The switching device 203 selects service plan configuration information with the lowest service price in response to the type of the interaction request.

For example, a communication device includes two eSIM cards. The network stream service rate of a first eSIM card is cheaper than the network stream service rate of a second eSIM card. The voice stream service rate of the second eSIM card is cheaper than the voice stream service rate of the first eSIM card. The switching device 203 is able to select the eSIM card with the lowest price in response to the type of the interaction (network stream or voice stream).

Furthermore, the switching device, in some embodiments, includes a router being able to transfer the first network signal and the second network signal. The communication mode switching and the communication group list establishment are then achieved. In some embodiments, the switching device includes a vehicle communication module being able to transfer the first network signal and the second network signal. The communication mode switching in the vehicle and the communication group list establishment are then achieved.

Figure 6:
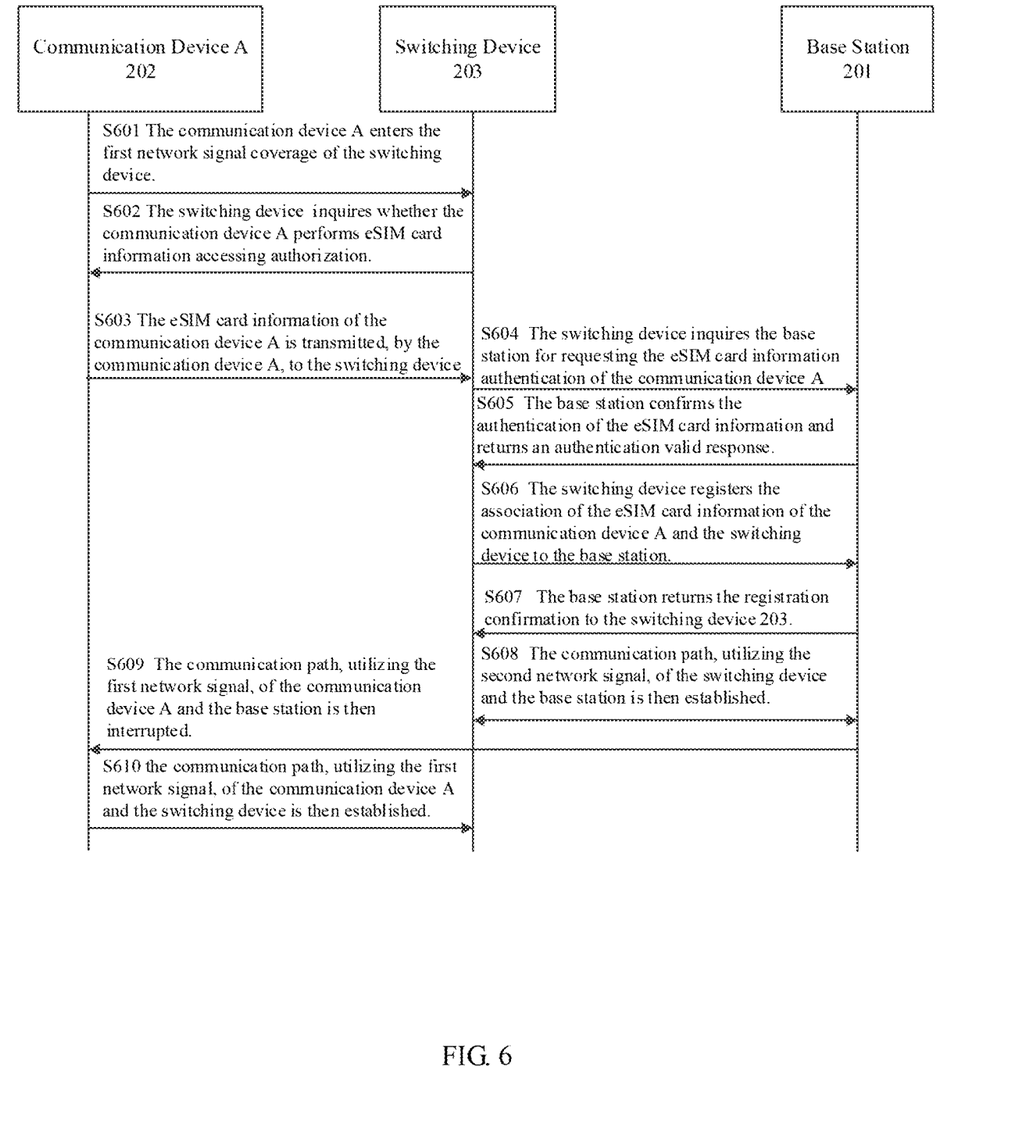
FIG. 6 shows a sequence diagram of eSIM card information authentication of a base station and a switching device of one embodiment of the present disclosure.

FIG. 6 shows a sequence diagram of eSIM card information authentication of a base station and a switching device of one embodiment of the present disclosure. The authentication process between the switching device 203 and the base station 201 is performed before the switching 203 starts to communicate, in response to the eSIM card information, with the external communication device.

As shown in FIG. 6, in step S601, the communication device A enters the first network signal coverage of the switching device 203. In this embodiment, when the communication device A consistently receives the first network signal, e.g. a Bluetooth signal, the communication device A is then located in the first network signal coverage of the switching device 203. In step S602, the switching device 203 inquires whether the communication device A performs eSIM card information accessing authorization. That is, in step S602, the communication device A determines whether the switching device 203 is another terminal device with the same number.

In step S603, the eSIM card information of the communication device A is transmitted, by the communication device A, to the switching device 203. In step S604, the switching device 203 inquires the base station 201 for requesting the eSIM card information authentication of the communication device A. In step S605, the base station 201 confirms the authentication of the eSIM card information and returns an authentication valid response. In step S606, the switching device 203 registers the association of the eSIM card information, e.g. the cell phone number, of the communication device A and the switching device 203 to the base station 201. In step S607, the base station 201 returns the registration confirmation to the switching device 203. In step S608, the communication path, utilizing the second network signal, of the switching device 203 and the base station 201 is then established. In step S609, the communication path, utilizing the first network signal, of the communication device A and the base station 201 is then interrupted. In step S610, the communication path, utilizing the first network signal, of the communication device A and the switching device 203 is then established.

Figure 7:
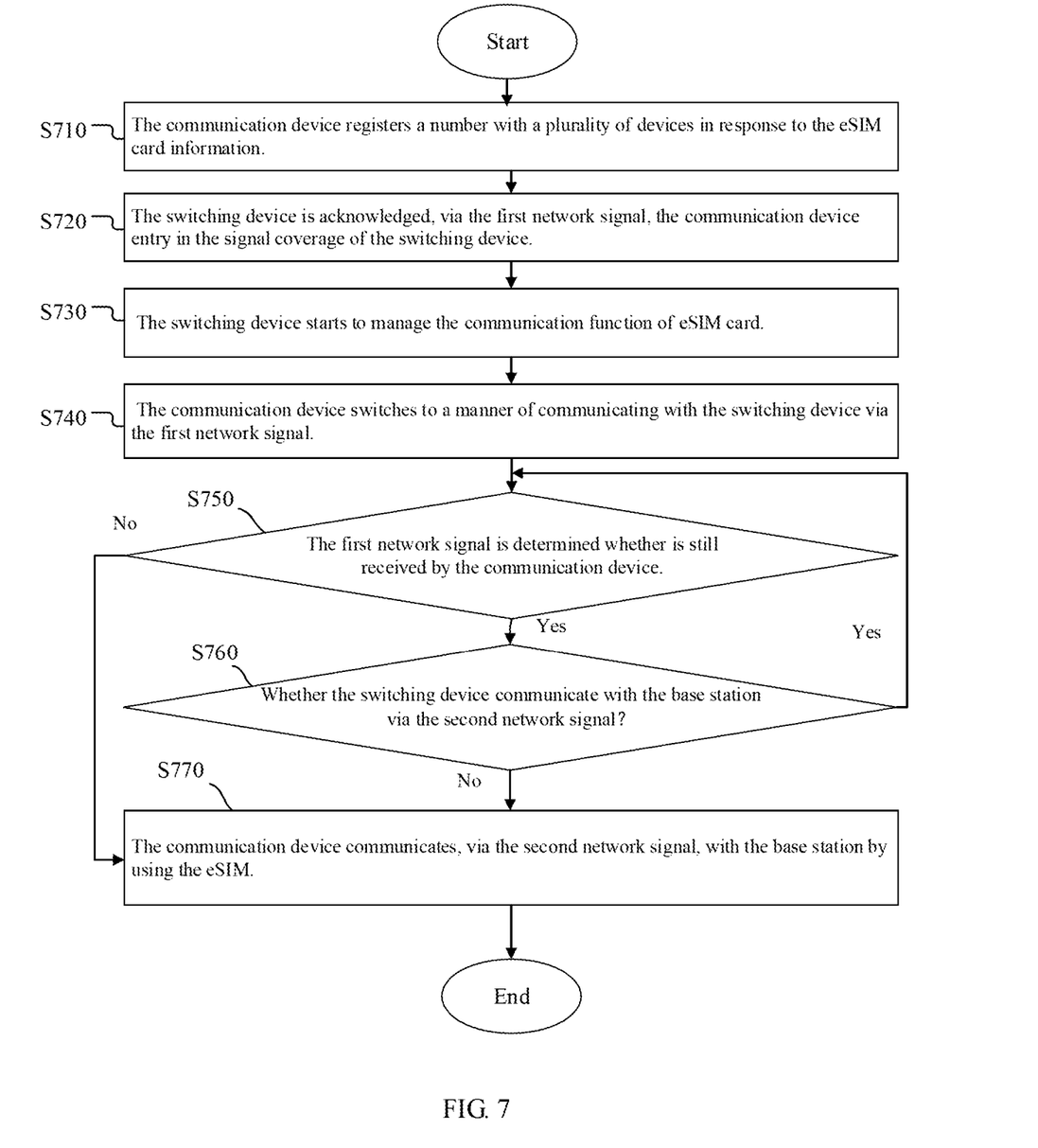
FIG. 7 shows a flow chart of a method of connection, via a switching device, between a communication device and a base station of one embodiment of the present disclosure.

FIG. 7 shows a flow chart of a method of connection, via a switching device, between a communication device and a base station of one embodiment of the present disclosure. In step S710, the communication device registers a number with a plurality of devices in response to the eSIM card information. In step S720, the switching device is acknowledged, via the first network signal, the communication device entry in the signal coverage of the switching device. In step S730, the switching device starts to manage the communication function of eSIM card. In step S740, the communication device switches to a manner of communicating with the switching device via the first network signal. In step S750, the first network signal is determined whether is still received by the communication device. In step S760, when the first network signal is no longer to be received by the communication device, the switching device is determined no longer to communicate with the base station via the second network signal. In step S770, when the first network signal is still received by the communication device, the communication device communicates with the base station by using eSIM.

In the step S750, the communication device is determined whether receives the first network signal. The communication device is determined whether is still communicated with the switching device. If the communication device is not communicated with the switching device, the communication device directly communicates with the base station via the second network signal using the eSIM. If the communication device is still communicated with the switching device, proceed to step S760 to determine whether the switching device is still communicated with the base station through the second network signal. If the switching device is not communicated with the base station through the second network signal, in other words, the communication device cannot be communicated with the base station through the switching device, the communication device directly uses the eSIM to connect to the base station through the second network signal. If the switching device is still communicated with the base station by using the second network signal, it is cyclically performed through steps S750 and S760 to determine the communication state between the communication device and the switching device, and the communication state between the switching device and the base station. The communication device is determined whether is necessary to directly communicate with the base station via the second network signal by using the eSIM.

FIG. 7 shows a process of the step of switching between the switching device and the base station, and the present disclosure is not limited thereto.

Figure 8:
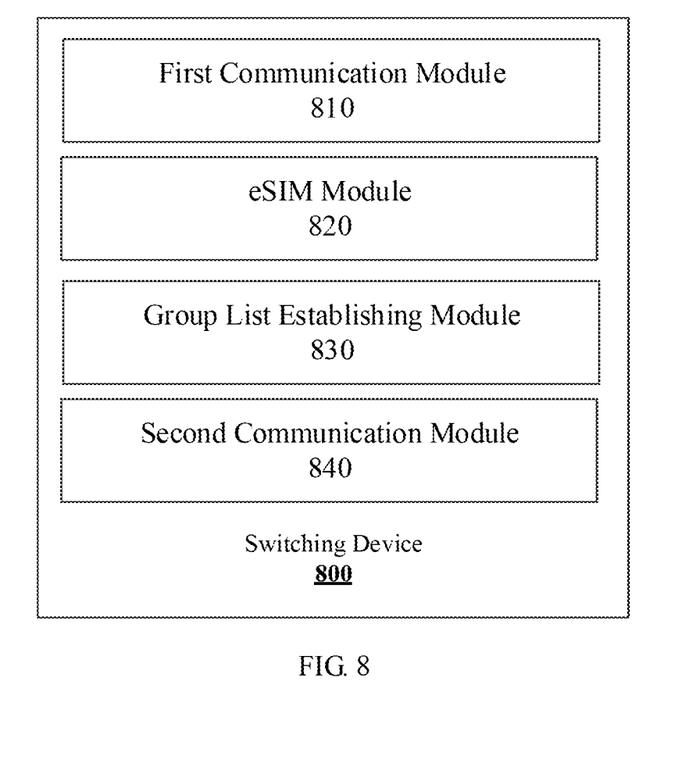
FIG. 8 shows a functional diagram of a switching device of one embodiment of the present disclosure.

FIG. 8 shows a functional diagram of a switching device of one embodiment of the present disclosure.

The switching device 800 includes a first communication module 810, an eSIM module 820, and a group list establishing module 830. The first communication module 810 is configured to exchange data by using the first network signal. The eSIM module 820 is configured to receive, by using the first network signal, a group configuration information of the at least one communication device having the eSIM card. The group configuration information includes the eSIM card information. The eSIM card information is used to establish, by the group list establishing module 830. The communication group list is used for data sharing, performed by the switching device, between the communication devices on the communication group list.

The switching device of the present disclosure establishes a communication group list in response to eSIM card information carried by a first network signal which allows the devices, having the eSIM card information carried by a first network signal, to interact each other for data sharing. Therefore, for on-line data sharing and interactions between the communication devices, it is not required for users to input mobile phone number face-to-face or other social network accounts.

In one embodiment of the present disclosure, the switching device 800 further includes a second communication module 840. The second communication module 840 is configured to exchange data with the base station via the second network signal by using the eSIM card information of the communication device on the communication group list.

Therefore, the communication device having the eSIM card and the communication device having the eSIM card on the communication group list and the communication device can communicate through the conversion of the first network signal and the second network signal by the switching device, which is equivalent to The communication mode of the communication device with the eSIM card is switched by the switching device, thereby improving the data interaction of the communication device due to the instability of the second network signal.

Thus, in some embodiments, a communication device having eSIM card is capable of communicating, via the switching device, with another communication device having eSIM card inside and outside the communication group list with utilizing the first network signal and the second network signal, which means the communication mode of the communication device having eSIM card is switched by the switching device. Therefore, the data interactions of the communication devices are switched to the first network signal when the reception of the second network signal is not stable.

In one embodiment of the present disclosure, the radiation strength of the first network signal is weaker than the radiation strength of the second network signal. The first network signal includes WIFI, Bluetooth, Ultra Wideband (UWB) and Zigbee. The second network signal includes a carrier network signal. Furthermore, the second network, e.g. a mobile 4G network, has radiation power 100-300 $\mu W/cm^2$. The first network, a short range network, i.e. Bluetooth, has radiation power 1-4 $\mu W/cm^2$. In some embodiments, the first network includes a wireless local area network (WLAN) having radiation power smaller than the second network, ZigBee, ultra wide band (UWB). Therefore, the signal radiation is then reduced when the communication device communicates with other communication devices.

FIG. 8 is a schematic block diagram of a switching device provided by the present disclosure. Without departing from the concept of the present invention, the splitting, merging, and adding of the modules are all within the protection scope of the present disclosure.

The present disclosure provides a system of group establishment for multi-login authentication user. FIG. 2 shows a schematic view of a system of group establishment for multi-login authentication user of one embodiment of the present disclosure As shown in FIG. 2, the system of group establishment for multi-login authentication user includes the switching device 203 shown in FIG. 8 and the plurality of communication devices 202. The plurality of communication devices 202, e.g. the communication device A, the communication device B and the communication device C, located in the first network signal coverage 104 perform data sharing via the switching device 203. In some embodiments, when the signal strength of the second network signal between the communication device A and the base station 201, shown in FIG. 5, is smaller than the threshold, e.g. the signal strength is smaller than −90 dBm, the communication device A then communicates with the switching device 203 via the first network signal and terminates the communication, utilizing the second network signal, with the base station 201.

The system of the present disclosure establish a communication group list in response to eSIM card information carried by a first network signal which allows the devices, having the eSIM card information carried by a first network signal, to interact each other for data sharing. Therefore, for on-line data sharing and interactions between the communication devices, it is not required for users to input mobile phone number face-to-face or other social network accounts. Moreover, a communication device, on the communication group list, having eSIM card is able to communicate with another communication device, having eSIM card, on the communication group list or another communication device, having eSIM card, outside the communication group list by interactively switching the first network signal and a second network signal via a switching device. In the present disclosure, the communication signal mode is switchable by the switching device in order to maintain the communication quality between the communication devices having eSIM card if the network signal is not stable. The signal radiations generated during interactions between the communication devices having eSIM card are then minimized by switching, by the switching device, the communication mode of the communication devices having eSIM card.

In some embodiments of the present disclosure, a computer readable storage medium is provided. The computer readable storage medium stored computer programs executed by, e.g. a processor, to implement the steps of the method of the embodiments of the present disclosure. In some implementations, in some aspects, the present disclosure is embodied in the form of a program product comprising program code for a terminal device to perform the above-described electronics of the present disclosure. When the program product is implemented on a terminal device, the steps of the exemplary embodiments of the present disclosure are performed.

Figure 9:
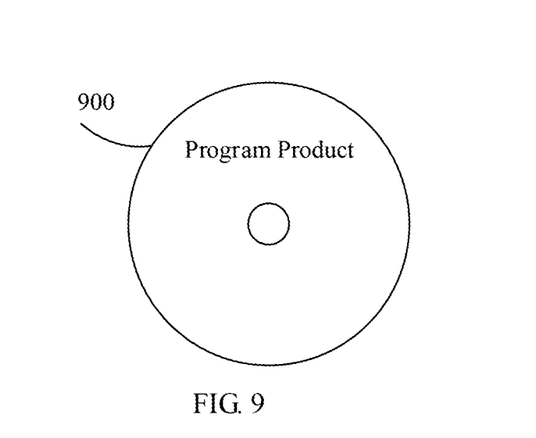
FIG. 9 shows a schematic view of a computer readable storage medium of one embodiment of the present disclosure.

FIG. 9 shows a schematic view of a computer readable storage medium of one embodiment of the present disclosure. As show in FIG. 9, the computer readable storage medium includes a program product 900, e.g. a CD-ROM including programming code which is executed by a terminal device, e.g. a personal computer, but the computer readable storage medium of the present disclosure is not limited. In some embodiments, the computer readable storage medium of the present disclosure includes any tangible medium that contains or stores a program, used by or in connection with an instruction execution system, apparatus, or device.

A program product employs any combination of one or more readable media. The readable medium includes a readable signal medium or a readable storage medium. The readable storage medium includes, for example, but not limited to, an electronic, magnetic, optical, electromagnetic, infrared, or semiconductor system, device, or device, or any combination of the above. In some embodiments, the readable storage media includes: electrical connections with one or more wires, a portable disk, a hard disk, a random access memory (RAM), a read only memory (ROM), erasable programmable read only memory (EPROM), optical fiber, portable compact disk read only memory (CD-ROM), optical storage device, magnetic storage device, or any combinations of the foregoing.

The computer readable storage medium includes data signals that are propagated in the baseband or as part of a carrier, in which readable program code is carried. Such propagated data signals takes a variety of forms including, but not limited to, electromagnetic signals, optical signals, or any suitable combination of the foregoing. The readable storage medium also is any readable medium other than a readable storage medium that is transmitted, propagated or transmitted for use by or in connection with an instruction execution system, apparatus or device. Program code embodied on a readable storage medium is transmitted via any suitable medium, including but not limited to wireless, wires, optical cable, RF, etc., or any combination of the foregoing.

Program code for performing the methods of the present disclosure is coded in any combination of one or more programming languages, including an object oriented programming language such as Java, C++, conventional procedural programs, etc. A programming language such as a "C" language or a similar programming language. The program code is completely executed on the computing device, partially on the computing device, a standalone software package, partially executed by the remote computing device and partially executed by the tenant computing device, or completely executed by the remote computing device or server. In the case of a remote computing device, the remote computing device is connected to the tenant computing device via any kind of network, including a local area network (LAN) or wide area network (WAN), or is connected to an external computing device (e.g. Internet service provided by the Internet service provider).

In an exemplary embodiment of the present disclosure, an electronic device is provided. The electronic device includes a processor, and a memory for storing instructions executed by the processor, wherein the processor is configured to perform the steps of the method in any of the mentioned embodiments by executing the instructions.

Those skilled in the art will realize that various aspects of the present disclosure are implemented as a system, method, or program product. Therefore, the various aspects of the present disclosure embodied in the form of a hardware implementation, a software implementation (including firmware, microcode, etc.), or a combination of hardware and software, which may be collectively referred to herein as circuit, module or system.

Figure 10:
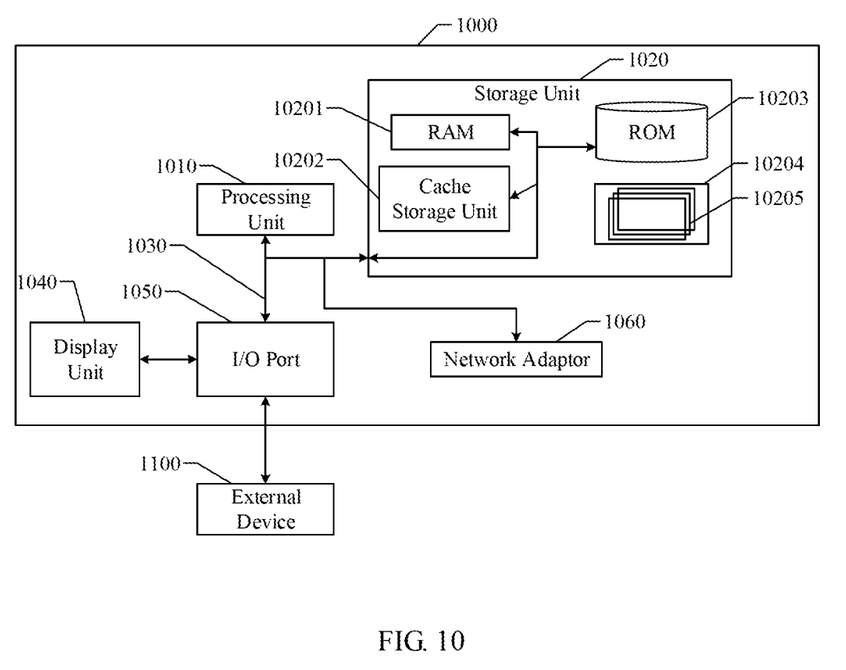
FIG. 10 shows a schematic view of an electronic device of one embodiment of the present disclosure.

FIG. 10 shows a schematic view of an electronic device of one embodiment of the present disclosure. As shown in FIG. 10, the electronic device 1000 includes at least one processing unit 1010, at least one storage unit 1020, a BUS 1030 coupled to a plurality of system components (e.g. the storage unit 1020 and the processing unit 1010) and a display unit 1040. The programming code, i.e. instructions, of the method, the steps shown in FIG. 1, of the present disclosure, executed by the processing unit 1010, is stored in the storage unit.

The storage unit 1020 includes a readable medium in the form of a volatile storage unit, such as a random access storage unit (RAM) 10201 and/or a cache storage unit 10202, and a read only storage unit (ROM) 10203.

The storage unit 1020, in some embodiments, further includes at least one programming code of the programming module 10205 or utility tool 10204. The programming module 10205 includes, but is not limited to, an operating system, one or a plurality of applications, other program modules, and programming data.

The BUS 1030 presents various types of bus structures, including a storage unit bus, a storage unit controller, a peripheral bus, a graphics acceleration port, a processing unit, or a local bus using any of a variety of bus structures.

The electronic device 1000 communicates with at least one external electronic device 1100 (e.g. a keyboard, a pointing device, a Bluetooth device) and also communicates with at least one communication device that enable the tenant to interact with the electronic device 1000. The electronic device 1000 also communicates with any device (e.g. a router, and a modem) that communicates with one or more other computing devices. These communications are achieved via an input/output (I/O) interface 1050. Moreover, the electronic device 1000 also communicates, via the network adapter 1060, with one or more networks (e.g. a local area network (LAN), a wide area network (WAN), and/or a public network, such as the Internet). The network adapter 1060 communicates with other modules of electronic device 1000 via the BUS 1030. It should be understood that other hardware and/or software modules may be utilized in conjunction with electronic device 1000, including but not limited to: microcode, device drivers, redundant processing units, external disk driving arrays, RAID systems, tape drivers and data backup storage systems.

Those skilled in the art will understand that the embodiments described herein may be implemented by software or by software in combination with necessary hardware after reading through the description of the above embodiments. Therefore, the technical solution according to the embodiment of the present disclosure may be embodied in the form of a software product, which may be stored in a non-volatile storage medium (e.g. a CD-ROM, a USB flash drive, and a mobile hard disk) or on the network. The computer readable storage medium includes instructions, e.g. a CD-ROM including programming code which is executed by a terminal device, e.g. a personal computer.

The method and the devices of the present disclosure establish a communication group list in response to eSIM card information carried by a first network signal which allows the devices, having the eSIM card information carried by a first network signal, to interact each other for data sharing. Therefore, for on-line data sharing and interactions between the communication devices, it is not required for users to input mobile phone number face-to-face or other social network accounts. Moreover, a communication device, on the communication group list, having eSIM card is able to communicate with another communication device, having eSIM card, on the communication group list or another communication device, having eSIM card, outside the communication group list by interactively switching the first network signal and a second network signal via a switching device. In the present disclosure, the communication signal mode is switchable by the switching device in order to maintain the communication quality between the communication devices having eSIM card if the network signal is not stable. The signal radiations generated during interactions between the communication devices having eSIM card are then minimized by switching, by the switching device, the communication mode of the communication devices having eSIM card.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of group establishment for multi-login authentication user implemented by a switching device, the method comprising steps of:

receiving, by the switching device, group configuration information, carried by a first network signal, of at least one communication device including an embedded Subscriber Identification Module (eSIM) card, wherein the group configuration information includes eSIM card information; and establishing, by the switching device, a communication group list which allows the communication devices on the list to interacts each other via the switching device for data sharing, wherein the step of establishing, by the switching device, a communication group list comprises:

registering, by the switching device, association of the switching device with the eSIM card information at an external base station; and establishing, by the switching device, a communication path, utilizing a second network signal, of the switching device and the external base station.

2. The method of claim 1, wherein the communication group list is transmitted, by the switching device, to at least one of the communication devices on the list.

3. The method of claim 2 further comprising:
receiving, by the switching device, a first interaction request transmitted by the communication device on the communication group list, wherein the first interaction request is used to indicate one of the other communication devices on the list as a candidate interaction device; and
establishing, by the switching device, a first data transmission path of the communication device on the communication device list and the indicated communication device in response to the first interaction request.

4. The method of claim 3, wherein the first interaction request includes at least one of a document transmission request, a voice interaction request and a video stream interaction request.

5. The method of claim 4, wherein the document transmission request includes interaction request and/or data interaction request of user identification information, wherein the user identification information includes user name information and/or job position information.

6. The method of claim 1 further comprising:
receiving, by the switching device, a second interaction request of a first communication device outside the communication group list, wherein the second interaction request is used to indicate at least one communication device on the communication group list as a candidate second communication device; and
establishing, by the switching device, a second data transmission path of the first communication device and the indicated second communication in response to the second interaction request.

7. The method of claim 1, wherein the communication device on the communication group list terminates communication with the external base station, after the communication group list is established by the switching device.

8. The method of claim 7, wherein after the communication device on the communication list interrupts communication with the external base station, the communication device communicates, by utilizing the second network signal, with the external base station in response to the eSIM card information when the communication device on the communication list interrupts communication with the switching device or when the switching device interrupts communication with the external base station.

9. A switching device, comprising:
a first communication circuit configured to transceive information via a first network signal;
an embedded Subscriber Identification Module (eSIM) circuit configured to receive group configuration information, carried by the first network signal, of at least one communication device including an eSIM card, wherein the group configuration information includes eSIM card information;
a group list establishing circuit configured to establish a communication grouping list in response to the received eSIM card information which allows the communication devices on the list to interacts each other via the switching device for data sharing; and
a second communication circuit configured to communicate, by utilizing a second network signal, with a base station in response to the eSIM card information of the communication device on the communication group list, wherein the switching device is configured to receive service plan configuration information of a SIM card and service plan configuration information of the eSIM card of the communication device on the communication group list, wherein the switching device selects a service plan configuration information with the lowest service price in response to the type of the interaction request.

10. The switching device of claim 9, wherein the signal radiation of the first network signal is smaller than the signal radiation of the second network signal.

11. The switching device of claim 9, wherein the first network signal includes one of a WIFI signal, a Bluetooth signal, an Ultra Wideband (UWB) signal and a Zigbee signal and the second network signal includes a carrier network signal.

12. A method of group establishment for multi-login authentication user implemented by a switching device, the method comprising steps of:
receiving, by the switching device, group configuration information, carried by a first network signal, of at least one communication device including an embedded Subscriber Identification Module (eSIM) card, wherein the group configuration information includes eSIM card information;
establishing, by the switching device, a communication group list which allows the communication devices on the list to interacts each other via the switching device for data sharing;
receiving, by the switching device, a second interaction request of a first communication device outside the communication group list, wherein the second interaction request is used to indicate at least one communication device on the communication group list as a candidate second communication device; and
establishing, by the switching device, a second data transmission path of the first communication device and the indicated second communication in response to the second interaction request.

* * * * *